United States Patent [19]

Franzen

[11] 4,116,246
[45] Sep. 26, 1978

[54] BEVERAGE DISPENSER

[75] Inventor: Raymond E. Franzen, Anoka, Minn.

[73] Assignee: Medalie Manufacturing Co., Minneapolis, Minn.

[21] Appl. No.: 731,624

[22] Filed: Oct. 12, 1976

[51] Int. Cl.² ............................................. B65B 1/04
[52] U.S. Cl. .................................... 141/362; 222/70;
222/73; 222/135; 222/145; 222/146 HE;
198/558
[58] Field of Search ................... 222/73, 70, 146 HE,
222/135, 145, 413; 141/362, 250–284; 198/558,
548

[56] References Cited

U.S. PATENT DOCUMENTS

| | | | |
|---|---|---|---|
| 1,122,619 | 12/1914 | Maas | 198/558 |
| 2,896,253 | 7/1959 | Mol | 198/548 |
| 3,074,822 | 1/1963 | Walk et al. | 222/413 |
| 3,155,288 | 11/1964 | Landgraf | 198/558 |
| 3,822,810 | 7/1974 | Fuqua | 222/146 HE |
| 3,900,136 | 8/1975 | Paranto | 222/70 |
| 3,921,855 | 11/1975 | Syverson | 222/146 HE |
| 3,927,802 | 12/1975 | Lavochkin et al. | 222/146 HE |

Primary Examiner—Houston S. Bell, Jr.
Attorney, Agent, or Firm—Burd, Braddock & Bartz

[57] ABSTRACT

A machine for dispensing a beverage into a container formed from a mixture of a dry granular base food product and water. The machine has a product metering unit carrying a food product storage container. The metering unit has a rotatable auger driven by a drive mechanism including an electric motor to dispense food product into a mixing bowl. A solenoid control valve operates to control the flow of water to the mixing bowl when the electric motor for the dispensing unit is actuated. An adjustable means restricts the size of the water carrying hose from the valve to the bowl to regulate the flow rate of water to the mixing bowl.

28 Claims, 10 Drawing Figures

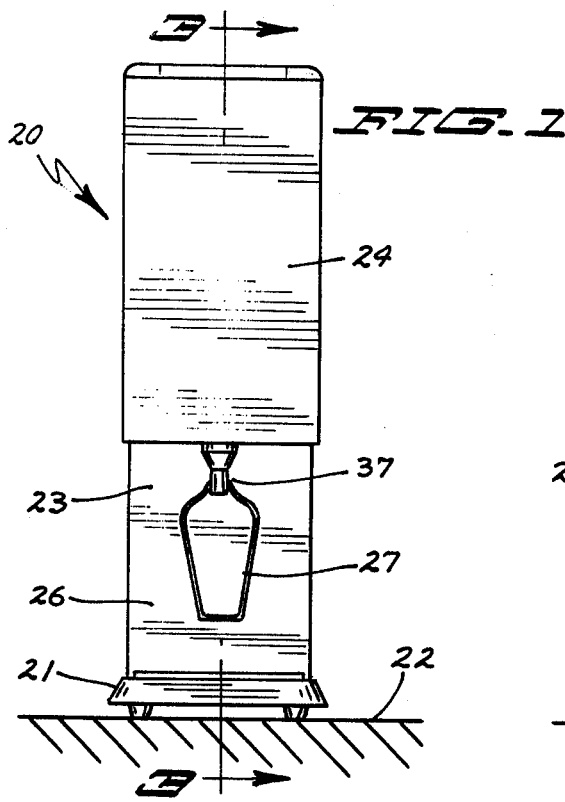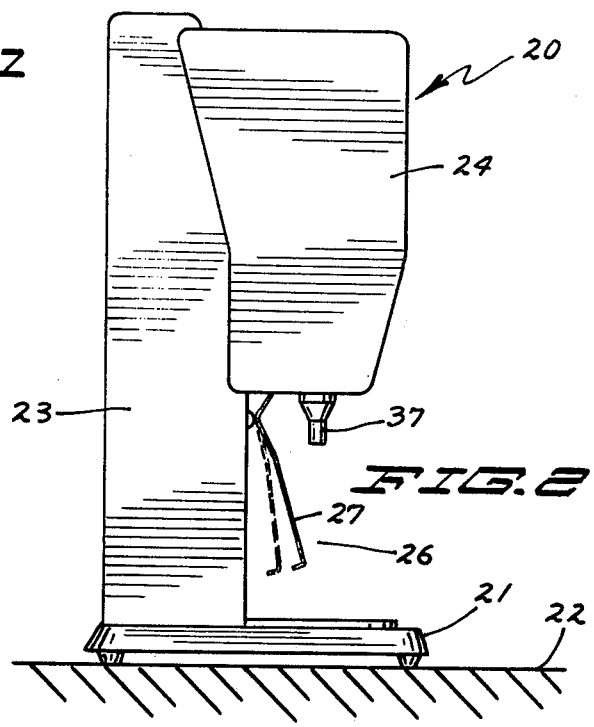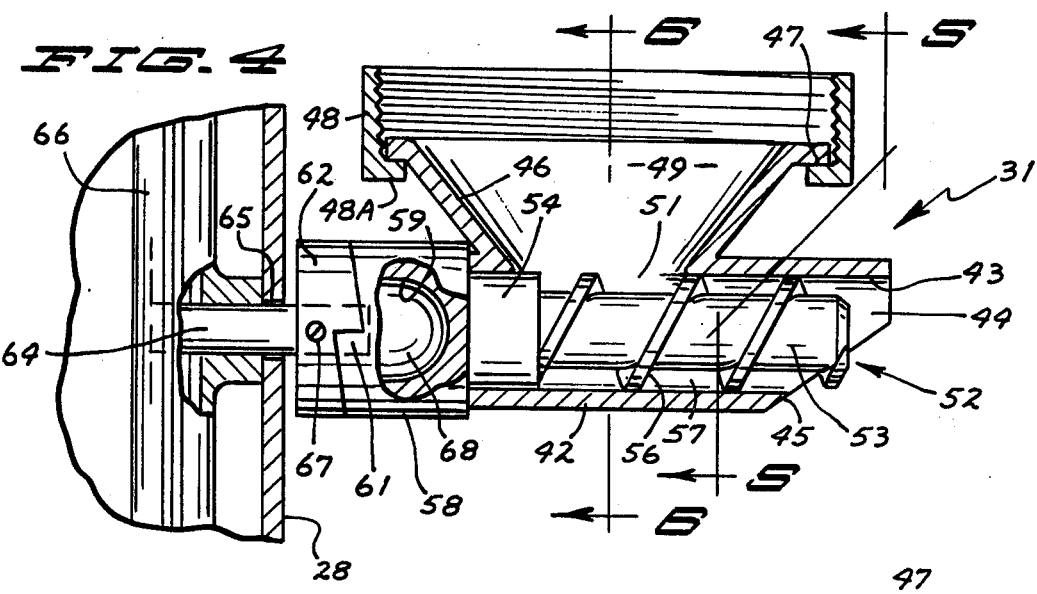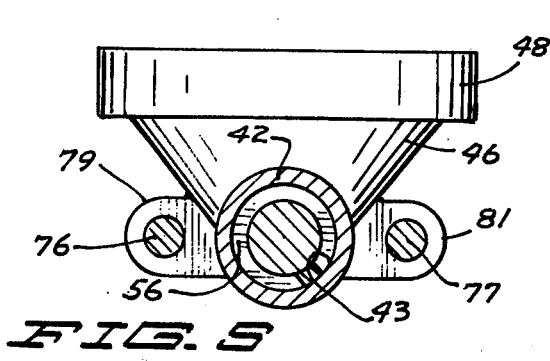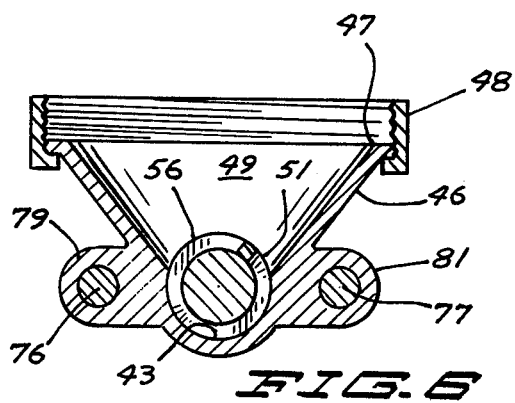

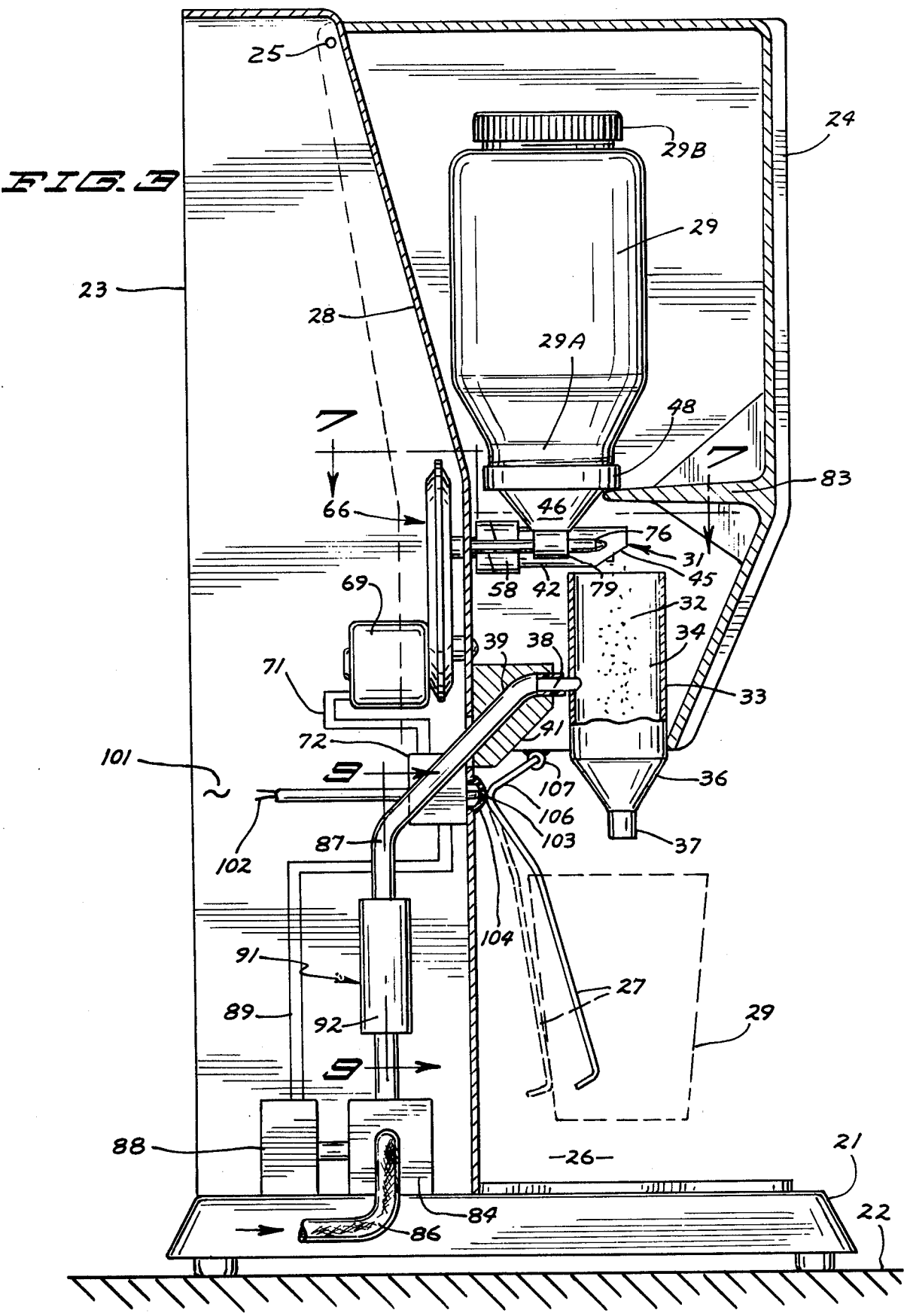

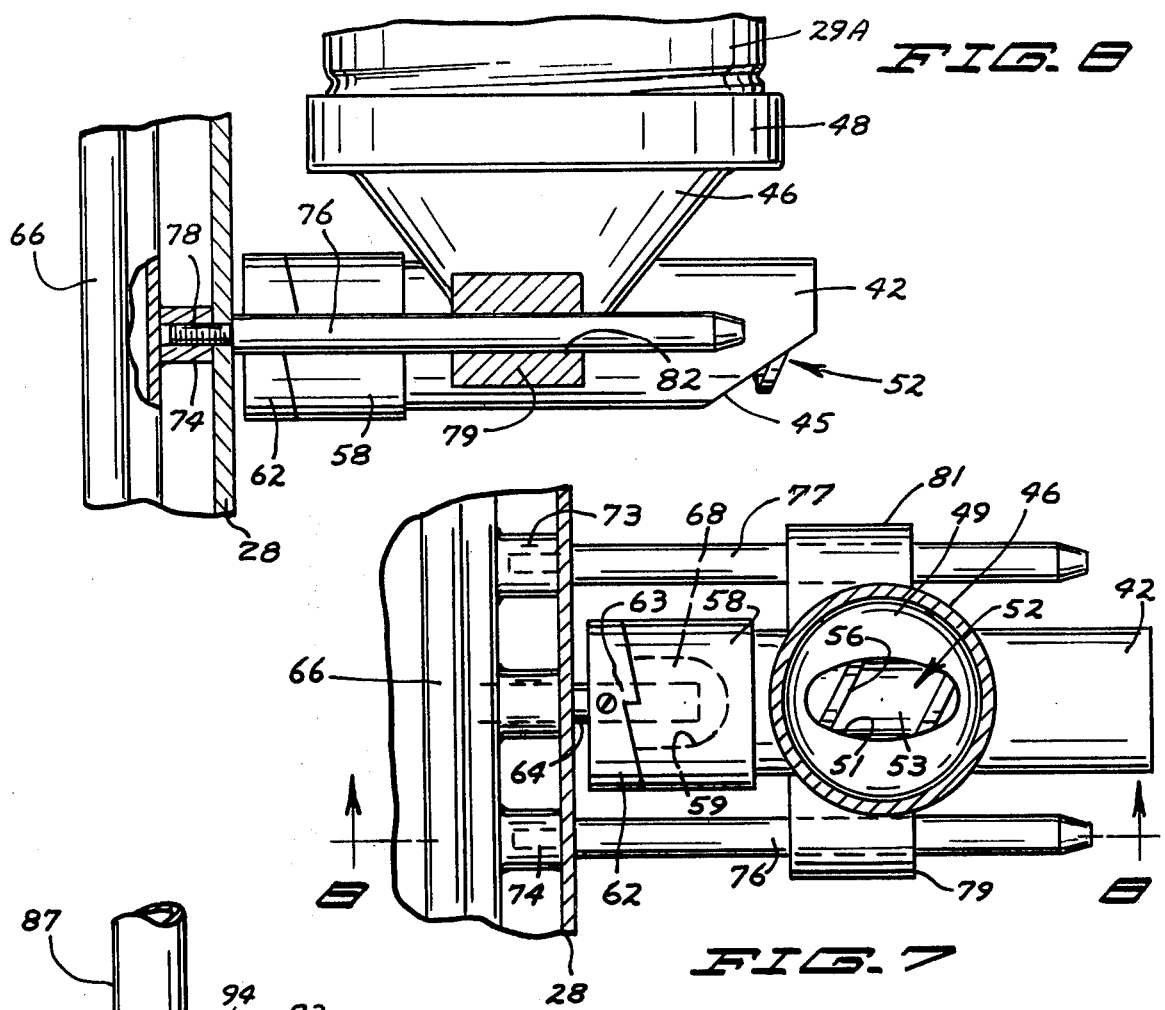
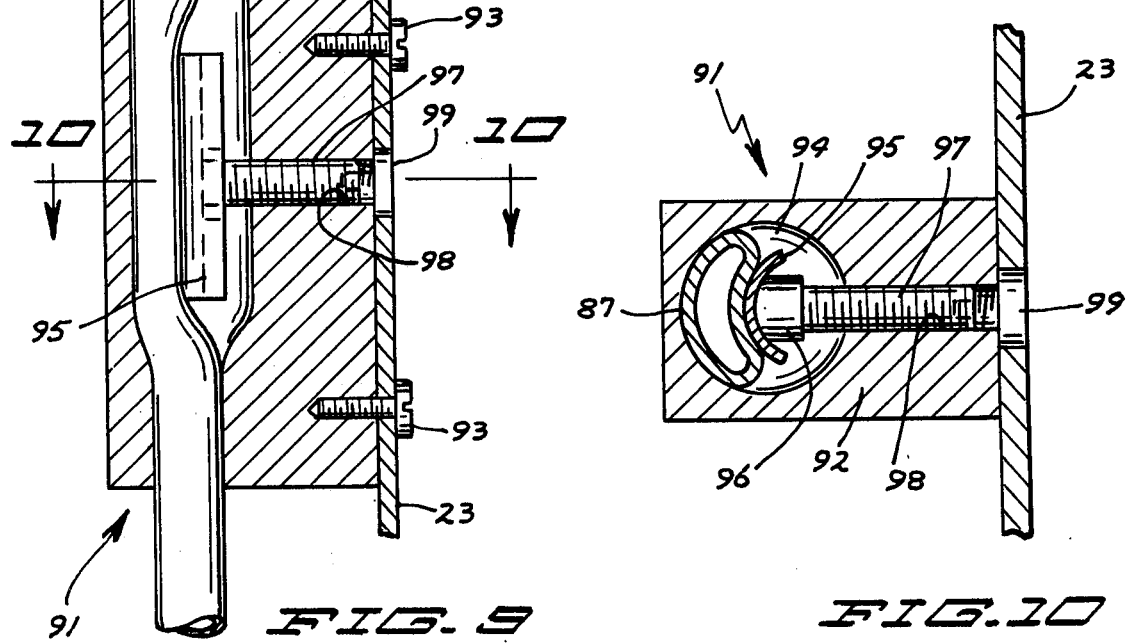

BEVERAGE DISPENSER

BACKGROUND OF THE INVENTION

Machines have been developed to mix powdered food products and water, both hot and cold, to form a drink, such as tea, coffee and hot chocolate. These machines have food product and water control structures that regulate the amounts of water and food product that are delivered to a mixing chamber. It is a common practice to mix the water and food product in the final container such as a cup or glass used by the consumer of the beverage.

Granular dried food products such as powdered tea and coffee become caked and solid due to the absorption of atmospheric moisture. When the food product is solid, it does not feed through its dispensing structure, whereby only liquid is dispensed into the container. The machine must be disassembled and cleaned and reassembled before it will be operational. This requires considerable attention and time, as well as causing dissatisfied consumers.

Examples of machines for mixing food products and dispensing the products are shown by McPherson in U.S. Pat. No. 3,170,598 and Wienert et al in U.S. Pat. No. 3,587,529.

SUMMARY OF THE INVENTION

The invention is directed to an apparatus for mixing solid and liquid food products to form a beverage or drink and dispense the beverage into a container, as a glass or cup. The apparatus has a casing supporting a dispenser and a mixing bowl. The dispenser has a metering unit having an elongated passage accommodating a rotatable auger operable to dispense a granular food product into the mixing bow. A container for storing the granular products is mounted on the metering unit. The entire dispenser is removably mounted on a pair of elongated support members attached to the casing. A drive means mounted on the casing operates to rotate the auger. The drive means includes an electric motor controlled by a switch. A trigger is engaged by the container for receiving the beverage and moved to actuate the switch. When the switch is on the "on" position, the food product and liquid is simultaneously discharged into the mixing bowl. The food product mixes with the liquid in the mixing bowl and is discharged into the container. A valve actuated with a solenoid connected to the switch controls the flow of water to the mixing bowl. The rate of flow of water into the mixing bowl is regulated with a flow control regulator that restricts the passage that carries the liquid from the control valve to the mixing bowl.

An object of the invention is to provide a beverage dispenser that includes a non-clogging metering unit that does not depend on gravity to feed a food product to a location where the food product is mixed with a liquid, as water. A further object of the invention is to provide a beverage dispenser that has large storage capacity for a dry granular food product, as iced tea, granular drink product or coffee. A further object of the invention is to provide a dispensing apparatus with a metering unit that does not allow air and moisture to get into the stored dried granular food product. Yet another object of the invention is to provide a beverage dispenser with operable parts that can be readily disassembled and are easily and conveniently cleaned. Yet a further object of the invention is to provide a beverage dispenser that is versatile in use and can be used with conventional dry food product containers or jars. Another object of the invention is to provide a beverage container that has a fast operating cycle and provides consistent beverage concentration. These and other objects are set out in the following description of the beverage dispenser.

IN THE DRAWINGS

FIG. 1 is a front elevational view of the beverage dispenser of the invention;

FIG. 2 is a side elevational view of FIG. 1;

FIG. 3 is an enlarged sectional view taken along the line 3—3 of FIG. 1;

FIG. 4 is an enlarged longitudinal sectional view of the metering unit of the dispenser of FIG. 3;

FIG. 5 is a sectional view taken along the line 5 — 5 of FIG. 4;

FIG. 6 is a sectional view taken along the line 6 — 6 of FIG. 4;

FIG. 7 is an enlarged sectional view taken along the line 7 — 7 of FIG. 3;

FIG. 8 is a sectional view taken along the line 8 — 8 of FIG. 7;

FIG. 9 is an enlarged sectional view taken along the line 9 — 9 of FIG. 3; and

FIG. 10 is a sectional view taken along the line 10 — 10 of FIG. 9.

PREFERRED EMBODIMENT OF THE INVENTION

Referring to the drawing, there is shown in FIGS. 1 and 2, the beverage dispenser of the invention indicated generally at 20. Dispenser 20 is operable to mix a granular or powdered food product, such as granular tea, coffee or soft drink base material with water or a suitable liquid to make a beverage drink and direct the drink into a collection container, as a cup or glass. Th term "granular food product" used in this disclosure includes all types of powdered and particulate products that can be mixed with a liquid to make a food consumable by man or animals. Dispenser 20 has a generally rectangular flat base 21 located on a horizontal support 22, such as a table or counter top. An upwardly directed generally U-shaped housing, cabinet or casing 23 is secured to the rear portion of base 21. Casing 23 is an upright frame or support attached to one end of the top of base 21. The back of casing 23 may be closed with a suitable back wall (not shown). A cover 24 mounted on the top of the front of housing 23 encloses the food product storage container 29 and dispensing apparatus 31 of the dispenser. Cover 24 is releasably mounted on the top of casing 23 with releasable hinge or pivot structures or removable bolts 25 whereby cover 24 can be separated from casing 23.

Dispenser 20 has a dispensing location or station 26 located below cover 24 and above base 21. A movable actuator or trigger 27 is located in the station and is movably mounted on the front wall 28 of the housing 23. A container 29, as shown in broken lines in FIG. 3, is located in the station 26 and engages the actuator 27. On movement of the container 29 toward the wall 28, dispenser 20 is actuated whereby a mixture of liquid and dissolved food product forming a beverage or drink is directed into container 29.

As shown in FIG. 3, dispenser 20 has a material metering unit indicated generally at 31 operable to meter a quantity of solid food product 32 into a mixing bowl 33.

Mixing bowl 33 has a chamber 34 and a funnel or cone shaped bottom wall 36 terminating in a downwardly directed tubular member or nipple 37. Nipple 37 has a passage open to chamber 34 so that the liquid and food product mixed in chamber 34 is directed downwardly into container 29.

Mixing bowl 33 has a lateral or side tubular extension 38 providing an entrance opening into chamber 34. Extension 38 is located within the outlet end of a liquid delivery hose 87. Hose 87 is located in an upwardly and forwardly inclined passage 39 in a block 41 secured to front of wall 28. Extension 38 extends into the open end of hose 87 and has a tight fit with hose 87 thereby mounting bowl 33 on block 41. Bowl 33 can be removed from the block 41 by removing the bowl in a forward direction after cover 24 has been removed from housing 23.

As shown in FIG. 4, material metering unit 31 has an elongated horizontal tubular body 42. Body 42 has an inside cylindrical wall 43 surrounding a longitudinal horizontal passage 44. The outer end 45 of body 42 is cut at a downward and inward angle to insure that the food product will be dispersed into the mixing bowl 33. An upwardly directed cone shaped member or funnel 46 is integral with the top portion of body 42. Funnel 46 has an open top end surrounded by an outwardly directed annular flange 47. An annular rim, ring or collar 48 surrounds funnel 46. Rim 48 has an inwardly directed flange 48A that cooperates with the lower side of flange 47 to hold the rim 48 in assembled rotatable relationship relative to funnel 46. As shown in FIGS. 3 and 8, rim 48 is threaded onto the lower neck 29A of container 29. Container 29 for the food product is mounted in an air-tight relationship on top of the funnel 46. Container 29 can be the conventional tea or coffee jar having a threaded neck 29A. The threaded rim 48 is threaded onto the threaded neck 29A to connect the funnel 49 to the container. The container can be an enlarged hollow member having a separate removable top 29B. The top 29B can be removed so that additional food product can be placed into the container.

Returning to FIGS. 4, 6 and 7, funnel 46 has a cone shaped chamber 49. Lower portion of chamber 49 has an elliptical opening 51 in communication with the passage 44. Opening 51 has its major or long axis extended parallel to the longitudinal axis of passage 44. The food product in the container 29 fills the chamber 49 and is directed toward the elliptical opening 51 by the downwardly and inwardly sloping walls of funnel 46. A material feeding means indicated generally at 52 is located in passage 44 and functions to move food product adjacent the elliptical opening 51 through the passage 44 and into the chamber 32 of mixing bowl 33. The material feeding means 52 also provides a seal that prevents moisture and air from flowing into chamber 49 and container 29 thereby minimizing the solidifying and caking of food product in container 29.

Material feeding means 52 has an auger having a horizontal solid shaft 53 secured to a cylindrical neck 54. Neck 54 is located in close rotating relationship with the inlet end of the tubular body 42. Shaft 53 extends substantially the full length of passage 44 and has a diameter smaller than the diameter of the cylindrical neck 54. A continuous helical rib or ribbon 56 is mounted on and extends outwardly from shaft 53. Ribbon 56 has a continuous flat outer surface located in surface engagement with the side cylindrical wall 43. Ribbon 56 is located in and closes the annular space 57 between the outer surface of shaft 53 and the inside cylindrical wall 43 thereby preventing air and moisture from flowing through passage 44 into the funnel chamber 49. Neck 54 is connected to a head 58. Head 58 contacts the inlet end of body 42 to limit axial movement of feeding means 52 in passage 44. The center portion of head 58 is open and is provided with a cavity 59. The outer annular edge of head 58 has a plurality of ratchet teeth 61. Shaft 53, neck 54, helical ribbon 56, and head 58 comprise a one-piece rotatable feeding member that is made from rigid material, as metal, plastic or the like.

Ratchet teeth 61 are engaged by a cylindrical member 62 having complementary ratchet teeth 63. Cylindrical member 62 is mounted on a drive shaft 64 extended outwardly from a gear box or power transmission 66. Shaft 64 extends through a hole 65 in wall 28 and into a hole in the center of cylindrical member 62. Set screw 67 threaded transversely through member 62 secures the member 62 to shaft 64. Cylindrical member 62 has an outwardly directed cylindrical portion 68 that fits into a cylindrical cavity 59 in head 58. Cylindrical portion 68 and cavity 59 maintain ratchet teeth 61 and 63 in concentric driving relationship relative to each other.

As shown in FIG. 3, an electric motor 69 is mounted on gear box 66. Lines 71 electrically connect motor 69 to a switch 72. Referring to FIGS. 7 and 8, gear box 66 has a pair of bosses 73 and 74 located in engagement with wall 28. A pair of bolts or rods 76 and 77 extend outwardly in cantilever manner from wall 28 and secure the gear box 66 to wall 28. As shown in FIG. 8, bolt 76 has a threaded extension or end 78 that projects through a hole in the wall 28 and is threaded into boss 79. Bolt 77 has a similar threaded end threaded into the boss 73. Bolts 76 and 77 are elongated cylindrical support members located adjacent opposite sides of tubular body 42.

Secured to opposite sides of tubular body 42 are side or cylindrical members 79 and 81. Each cylindrical member has longitudinal cylindrical hole 82 for accommodating the body of a bolt 76 or 77. The size of the hole 82, as shown in FIG. 8, is substantially the same as the outside diameter of the bolt 76 so that side members 79 and 81 have a relatively tight sliding fit on bolts 76 and 77. Bolts 76 and 77 support the material metering unit 31 on the wall 28 and hold head 58 in driving relationship with the drive cylindrical member 62 as shown in FIG. 7. The bolts 76 and 77 also support the container 29 which is attached to the top of the funnel 46 with threaded rim 48.

Returning to FIG. 3, cover 24 has an inwardly directed horizontal rib or flange 83. The terminal end of rib 83 engages the funnel 46 and holds metering unit 31 in its operative driving position on bolts 76 and 77. The weight of cover 24 pivoted at 25 to opposite sides of casing 23 hold clutching teeth 63 and teeth on head 58 in operative driving relationship. Cover 24 locates and maintains the drive relationship between head 58 and drive member 62 and locates the outlet end of passage 44 directly above bowl 33. The closed cover 24 automatically positions metering unit 31 on support bolts 76 and 77 without pre-alignment by the operator of the dispenser. This avoids misalignment and improper driving engagement between the teeth of head 58 and member 62. When the cover 24 is removed from housing 23, metering unit 31 can be retracted or slipped off of the bolts 76 and 77 whereby the container 29 can be replaced and the metering unit cleaned. Material feeding means 52 can be axially removed from the passage 44 so that the shaft 53 and helical flights 56 can be cleaned.

The liquid supply, such as water under pressure, is delivered to an on-off valve 84 mounted on base 21. A water supply hose 86 connected to valve 84 delivers the water to valve 84. A flexible outlet hose 87 connects valve 84 with passage 39 in block 41. The upper end of hose 87 extends upwardly into passage 39 in block 41 to deliver the water to the tubular extension 38. Valve 84 is controlled with a solenoid 88. Electrical conductor lines 89 connect solenoid 88 to switch 72. When switch 72 is turned on, solenoid 88 is energized and opens the valve 84 thereby allowing the water to flow through the outlet hose 87 and into chamber 32 of mixing bowl 33.

The rate of flow of water through the hose 87 is controlled with a flow control regulator indicated generally at 91. As shown in FIGS. 9 and 10, regulator 91 has a housing 92 secured to the side wall of casing 23 with a plurality of bolts 93. An upright cylindrical passage 94 extends through housing 92 and accommodates hose 87. A semi-circular shoe 95 located in passage 94 engages a section of hose 87. Shoe 95 has a central base or hub 96 accommodating the forward end of an adjusting screw 97. Screw 97 is threaded into a bore or hole 98 in housing 92. Bore 98 is open to a hole 99 in the side wall of casing 23 whereby the head end of the screw 97 is accessible to a tool, such as an Allen wrench or screw driver. In use, screw 97 is turned with suitable tool to move shoe 95 in passage 94. Shoe 95 is forced onto the side wall of flexible hose 87 to close or restrict the passage in tube 87. This restricts the flow of water through tube 87. Regulator 91 is a pinching or restricting valve that has an accurate liquid flow control providing for consistent liquid and food product ratio or concentration in mixing bowl 33. Shoe 95 uniformly collapses a long segment of the hose 87 whereby the hose passage has a uniform restricted passage. This type of restricted passage promotes laminar flow of liquid through hose passage. The result is a minimum of turbulence of the liquid and a uniform liquid flow rate.

Switch 72 is connected to an electrical power supply 101, as conventional electric power, with a cable or cord 102. Switch 72 has a movable finger or actuator 10 that extends toward the trigger 27. Actuator 103 is enclosed within a flexible cover or shield 104 mounted on wall 28. Shield 104 covers the hole in the wall 28 for the actuator 103 thereby preventing foreign material and liquids from passing through the hole in the wall 28. Shield 104 is a circular rubber grommet having an outwardly open annular groove to accommodate the circular edges of the wall forming the hole. The center portion of the grommet is a continuous flexible thin section that engages the outer end of switch actuator 103. An inward force on the center portion of the grommet will actuate switch 72. The trigger 27 has an elbow or curved upper portion 106 that engages the shield 104. Upper end of trigger 27 is pivotally mounted on a hinge or pivot member 107 secured to the bottom of cover 24.

In use, when the beverage container 29 is moved into engagement with trigger 27, the elbow 106 is forced into engagement with shield 104, thereby triggering switch 72. As long as the trigger 27 is depressed, as shown in broken lines in FIG. 3, switch 72 will remain on. When switch 72 is on, the solenoid 88 is actuated, thereby turning the valve 84 on so that the water flows through outlet hose 87 into mixing bowl 33. Motor 69 is also energized when switch 72 is on. Motor 69 drives the gear case 66 which in turn turns drive shaft 64. The rotating drive shaft 64 turns the material feeding means 52. The helical ribbon 56 on the material feeding means 52 forces the food product in passage 44 out the end 45 and into the chamber 32 of mixing bowl 33. The water enters the side of the mixing bowl and moves in a circular fashion in the mixing bowl. The circular moving water in chamber 32 mixes with the food product thereby forming the beverage comprising the food product dissolved in water. The beverage is dispensed in a downward direction through nipple 37 into container 29. The dispensing will be continuous until the force on trigger 27 is released so that the switch 72 will automatically return to the off position.

The flow rate of liquid through the outlet hose 87 is adjusted with regulator 91. Regulator 91 controls the amount of liquid that is discharged into the mixing chamber 32 during a given period of time. In this manner, the concentration of the food product to be dissolved in the liquid can be regulated. Screw 97, as shown in FIGS. 9 and 10, is adjusted to reposition shoe 95 in passage 94 and regulate the size of the passage in the portion of the tube 87 located in housing 92, thereby regulating the rate of flow or the amount of liquid that flows through the hose 87 in a given period of time.

Motor 69 driving the gear casing 66 rotates the material feeding means 52 at a constant rate of speed. Accordingly, the amount of material discharged by the material metering unit 31 is constant. The regulating rate of the flow of liquid into the chamber 32 will change the ratio of food product to liquid in accordance with the desired beverage concentration.

While there has been shown and described a preferred embodiment of the dispenser of the invention, it is understood that changes in the structures, shapes and materials may be made by those skilled in the art without departing from the invention. The invention is defined in the following claims.

The embodiments of the invention in which an exclusive property or privilege is claimed are defined as follows:

1. A machine for dispensing a beverage made by mixing a liquid with a granular food product comprising: a base adapted to engage a support, an upright wall mounted on the base, a container for storing a granular food product, means having a mixing chamber and an outlet passage wherein liquid and food product are mixed to form a beverage, a metering unit to receive food product from the container, means detachably mounting the container on the metering unit, said metering unit having rotatable means operable to dispense food product from the metering unit to said mixing chamber, cantilever mount means extending from said wall for slidably receiving and supporting the metering unit and container carried thereby on the wall above said base, said mount means thereby allowing the metering unit and container to be slidably removed as a unit from said wall for refill, cleaning and repair as necessary, drive means mounted on the wall engageable with and operable to rotate said rotatable means, means for controlling the amount of liquid discharged into the mixing chamber, said latter means including an on-off control valve operable to permit liquid to flow into the mixing chamber and to prevent liquid from flowing into the mixing chamber, and control means for concurrently actuating the drive means and valve whereby liquid and food product are simultaneously discharged into the mixing chamber forming the beverage, said beverage flowing into a collection container through the outlet opening in said means having a mixing chamber.

2. The machine of claim 1 wherein: the metering unit has a tubular body having an inside cylindrical wall surrounding a passage having an open discharge end, an upwardly and outwardly diverging funnel mounted on said body, said funnel defining a chamber open to the passage, said means mounting the container on the metering unit comprises means connecting the container for storing food product to said funnel whereby food product moves from the container to the chamber and into the passage, said rotatable means being located in the passage and operable upon rotation thereof to move food product through the passage and out the open discharge end thereof, said food product being discharged into the mixing chamber.

3. The machine of claim 2 wherein: the means connecting the container for storing food product to said funnel includes a ring member rotatably mounted on the funnel and threaded on the lower end of the container for storing food product.

4. The machine of claim 2 wherein: the opening between the chamber and passage has an elliptical shape with the major axis of the opening extended generally parallel to the longitudinal axis of the passage.

5. The machine of claim 2 wherein: the rotatable means includes an auger having a helical flight engageable with the cylindrical inside wall of the body.

6. The machine of claim 2 wherein: said rotatable means has a shaft having a cylindrical outer surface and a helical ribbon mounted on the cylindrical outer surface engageable with the cylindrical inside wall of the body, said helical ribbon extending from the opening between the funnel chamber to the open discharge end.

7. The machine of claim 6 wherein: said rotatable means has a cylindrical neck engageable with a portion of the cylindrical inside wall of the body.

8. The machine of claim 7 wherein: the rotatable means has a head connected to the neck, said head having means cooperating with the drive means whereby the drive means rotates the rotatable means.

9. The machine of claim 1 wherein: said drive means including a rotatable drive member, said rotatable means having a portion thereof drivably connected to the drive member whereby on rotation of the drive member the rotatable means is rotated.

10. The machine of claim 9 wherein: the drive member has first ratchet teeth and said portion has second ratchet teeth located in drive relationship with the first ratchet teeth.

11. The machine of claim 9 wherein: said portion has an axial recess, said drive member having a projection extended into the recess.

12. The machine of claim 1 wherein: said cantilever mount means includes elongated support members mounted on the wall, said metering unit having members provided with holes accommodating the support members whereby the metering unit can be removed from the support members.

13. The machine of claim 12 wherein: the support members are elongated cylindrical rods secured to the wall, and the members of the metering unit have elongated holes slidably accommodating the rods.

14. The machine of claim 1 wherein: the drive means and rotatable means have coacting members that drivably connect the drive means with the rotatable means, said coacting members being releasable whereby the rotatable means can be disconnected from the drive means, said mount means includes support means mounted on the wall, said metering unit having means cooperating with the support means to allow the metering unit to be removed from the support means and the rotatable means disconnected from the drive means.

15. The machine of claim 14 wherein: the coacting members comprise engaging teeth.

16. The machine of claim 14 wherein: the support means comprise a plurality of rods secured to the wall, said means cooperating with the support means including members on the metering means having elongated holes slidably accommodating the rods.

17. The machine of claim 14 wherein: the rotatable means has a shaft having a cylindrical outer surface and a helical ribbon mounted on the cylindrical outer surface engageable with the cylindrical inside wall of the body, said helical ribbon extending from the opening between the funnel chamber to the open discharge end.

18. The machine of claim 17 wherein: said rotatable means has a cylindrical neck engageable with a portion of the cylindrical inside wall of the body.

19. The machine of claim 18 wherein: the rotatable means has a head connected to the neck, said head having one of the coacting members and the drive means having a rotatable drive member having the other coacting member.

20. The machine of claim 14 including: a cover mounted on the casing to enclose the metering unit and container storing food product, said cover having a portion engageable with the metering unit to hold the coacting members in a driving relation with each other.

21. The machine of claim 1 wherein: the means for controlling the amount of liquid discharged to the mixing chamber includes a flexible hose connected to the on-off control valve, and means to restrict the flow of liquid through said hose.

22. The machine of claim 21 wherein: the means to restrict the flow of liquid through said hose includes a housing having a passage accommodating a portion of the hose, a shoe located in the passage engageable with the portion of the hose, and adjustable means for holding the shoe in a selected position in engagement with the portion of the hose to restrict the flow of liquid through said hose.

23. The machine of claim 1 wherein: the drive means includes an electric motor and the control means includes a solenoid operable to actuate the on-off valve and a switch operable to concurrently connect the electric motor and solenoid to a source of electric power thereby concurrently operating the electric motor and solenoid, said switch having an actuator, and a trigger movably mounted on the machine for moving the actuator to actuate the switch, said trigger being adapted to be engaged by the collection container located below the outlet passage of the means having a mixing chamber.

24. The machine of claim 1 wherein: the container for storing food product has an open bottom attached to the metering unit whereby food product moves from the container to the metering unit.

25. The machine of claim 24 wherein: the container for storing food product has an open top, and cover means for closing the open top of the container.

26. The machine of claim 1 wherein: the means having a mixing chamber is a mixing bowl having a bottom wall and downwardly directed nipple, said nipple having the outlet passage for directing the beverage to the collection container.

27. The machine of claim 26 wherein: the bowl has a side wall and an inlet opening in the side wall for directing liquid into the mixing chamber.

28. The machine of claim 1 including: a cover mounted on the casing enclosing the container and metering unit.

* * * * *

UNITED STATES PATENT AND TRADEMARK OFFICE
CERTIFICATE OF CORRECTION

PATENT NO. : 4,116,246
DATED : September 26, 1978
INVENTOR(S) : Raymond E. Franzen It is certified that error appears in the above—identified patent and that said Letters Patent are hereby corrected as shown below:

Column 2, line 38, "Th" should be -- The --.

Column 5, line 44, "10" should be -- 103 --.

Signed and Sealed this

Sixth Day of February 1979

[SEAL]

Attest:

RUTH C. MASON
Attesting Officer

DONALD W. BANNER
Commissioner of Patents and Trademarks